United States Patent
Raskin

[15] 3,638,487
[45] Feb. 1, 1972

[54] FLUID CHARACTERISTIC SENSING DEVICE

[72] Inventor: Seymour H. Raskin, Dallas, Tex.

[73] Assignee: Sands Measurement Corporation, Dallas, Tex.

[22] Filed: Nov. 14, 1969

[21] Appl. No.: 876,628

[52] U.S. Cl. .................................... 73/194 E, 73/228
[51] Int. Cl. .................................................. G01f 1/06
[58] Field of Search ............... 73/228, 88.5, 54, 59, 56, 194, 73/378 AR

[56] References Cited

UNITED STATES PATENTS

| | | | |
|---|---|---|---|
| 2,538,785 | 1/1951 | Karig | 73/116 |
| 3,195,351 | 7/1965 | Feldman | 73/194 |
| 3,293,909 | 12/1966 | Gledhill | 73/88.5 |
| 3,293,913 | 12/1966 | Hannon | 73/228 |
| 3,303,450 | 2/1967 | Brackett | 338/2 |
| 3,424,000 | 1/1969 | Chelner et al. | 73/228 |
| 3,424,001 | 1/1969 | Young | 73/228 |
| 3,433,064 | 3/1969 | Jacobson | 73/141 |
| 3,470,738 | 10/1969 | Laimins | 73/88.5 |
| 2,420,148 | 5/1947 | Ostergren | 73/398 |
| 2,747,408 | 5/1956 | Boytim et al. | 73/398 |

FOREIGN PATENTS OR APPLICATIONS

| | | |
|---|---|---|
| 631,973 | 11/1949 | Great Britain |
| 1,227,675 | 10/1966 | Germany |
| 426,957 | 9/1924 | Germany |

*Primary Examiner*—Richard C. Queisser
*Assistant Examiner*—John Whalen
*Attorney*—Walter J. Jagmin

[57] ABSTRACT

A device for sensing a characteristic, such as velocity or viscosity, of a fluid flowing through a flow conductor, the device having a housing connectable to the flow conductor and a tubular strain member having a longitudinal passage of the same internal diameter as the flow conductor disposed within the housing and constituting a section of the flow conductor, the strain member and the housing providing an annular chamber about the strain member, the fluid pressure of a fluid flowing through the flow conductor being communicated to the annular chamber by ports in the strain member or by a bypass conductor, and a plurality of strain gages spaced longitudinally of and bonded to the strain member and connected in a Wheatstone bridge circuit, the resistances of the strain gages at an upstream portion of the strain member varying as tension forces imposed on the upstream portion of the strain member and the resistances of strain gages at a downstream portion of the strain member varying as the compression forces imposed on the downstream portion by fluid flowing therethrough. The Wheatstone bridge provides an output voltage or signal which varies in accordance with the velocity of flow of the fluid through the strain member if the velocity of flow may vary and thus acts as a flow meter, or which varies in accordance with the viscosity of the fluid flowing through the strain member if the velocity of the fluid is constant and its viscosity may vary. The sensing device may also include means for sensing the temperature of the fluid to provide an output signal to a computer to which the output of the Wheatstone bridge is also transmitted so that the computer may provide an output signal, which is indicative of a certain characteristic of the fluid flowing therethrough, to a controlled device, such as a transducer, electrically operable valve, recorder and the like.

18 Claims, 4 Drawing Figures

PATENTED FEB 1 1972  3,638,487

INVENTOR
Seymour H. Raskin
BY
Walter J. Jay
ATTORNEY 3,638,487

FLUID CHARACTERISTIC SENSING DEVICE

This invention relates to sensing devices and more particularly to a sensing device for providing an electric signal which varies in accordance with a characteristic of a fluid flowing through a flow conductor.

An object of the invention is to provide a sensing device connectable to a flow conductor for sensing a characteristic, such as velocity or viscosity, of a fluid flowing through the flow conductor.

Still another object is to provide a sensing device, of the type described, which does not substantially affect the rate of flow of fluid through the conductor and does not impart turbulence thereto.

A still further object is to provide a sensing device which is of simple structure and which is easily connectable in flow conductor to constitute a section thereof.

An important object of the device is to provide a sensing device having a housing connectable to a flow conductor and provided with a tubular strain member which constitutes a section of the flow conductor, means associated with the strain member for providing an electric signal which varies in accordance with longitudinal forces exerted on upstream and downstream portions of the strain member due to the friction between the strain member and the fluid flowing through the strain member.

An important object of the invention is to provide a sensing device for sensing the velocity of fluid flowing through a flow conductor and providing an electric signal which varies in accordance with the velocity of flow of the fluid.

Another object is to provide an apparatus for sensing the velocity of flow of fluid through a flow conductor, the viscosity of the fluid varying with its temperature, the sensing device including means for sensing the temperature of the fluid flowing through the strain member and the longitudinal forces exerted on the strain member by the fluid flowing therethrough whereby the actual velocity of flow of the fluid may be determined, as by a computer, even though the longitudinal forces exerted on the strain member may vary as the temperature, and therefore the viscosity, of the fluid.

A further object is to provide a sensing device of the type described for providing an electric signal which varies in accordance with the viscosity of a fluid flowing at a constant rate through the strain member.

A still further object is to provide a sensing device for providing an electric signal which varies in accordance with the viscosity of a fluid flowing through the strain member, and the viscosity varying with the temperature of the fluid, the sensing device having means for sensing the temperature flowing through the strain member, whereby another characteristic of the fluid, such as its specific gravity, the concentration of a solution, and the like, which varies in accordance with the viscosity and temperature of the fluid, may be determined by a computer means.

Additional objects and advantages of the invention will be readily apparent from the reading of the following description of a device constructed in accordance with the invention, and reference to the accompanying drawings thereof, wherein.

Figure 1:
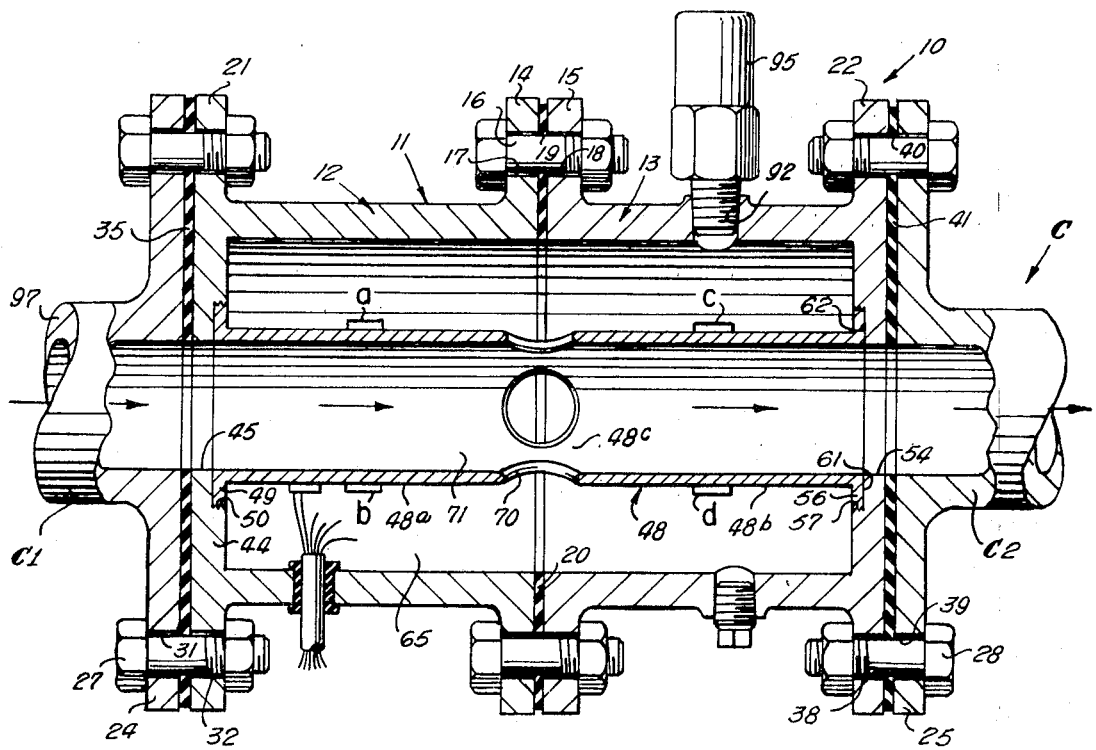
FIG. 1 is a somewhat schematic, longitudinal partly sectional view of a sensing device embodying the invention connected in a flow conductor to constitute a section thereof.
Figure 4:
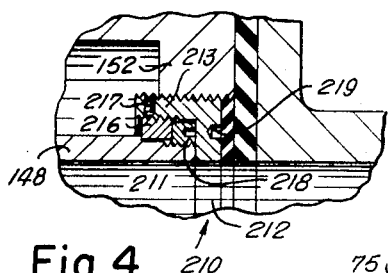

Referring now to the drawings, the sensing device 10 embodying the invention includes a housing 11 formed of two sections 12 and 13 having adjacent external annular end flanges 14 and 15, respectively, which are rigidly secured to one another by bolts 16 which extend through aligned apertures 17 and 18 of the flanges 14 and 15, respectively, and through apertures 19 of an annular gasket 20 interposed between the flanges 14 and 15, respectively, which seals therebetween.

The housing sections 12 and 13 have opposite end flanges 21 and 22 secured to the end flanges 24 and 25 of upstream and downstream sections C1 and C2, respectively, of a flow conductor C by means of bolts 27 and 28, respectively. The bolts 27 extend through aligned apertures 31 and 32 of the flanges 21 and 24 and the apertures 33 of an annular gasket 35 interposed between the flanges 21 and 24 which seals therebetween. Similarly, the bolts 28 extend through aligned apertures 38 and 39 of the flanges 21 and 25, respectively, and the apertures 40 of a gasket 41 interposed between the flanges 21 and 25 and sealing therebetween.

The housing section 11 has an internal annular flange 44 whose internal surface 45 is of the same diameter as the internal diameters of the flow conductor sections C1 and C2 and of a tubular strain member 48 which is disposed in the housing 11. The strain member 45 is secured at its upstream end to the internal flange 45 by means of its external annular flange 49 which is threaded in an annular recess 50 of the internal flange 44.

The housing section 13 is provided at its downstream end with an internal annular flange 52 whose internal surface 54 is of the same diameter as the internal diameter of the strain member 48 and of the flow conductor sections C1 and C2. The strain member is secured to the internal annular flange 52 of the housing section 13 by its external annular flange 56 which is threaded in the annular recess 57 of the internal flange 52 of the housing section 13. The annular end surface 61 of the strain member end flange 56 may abut the similar annular shoulder surface 62 of the internal flange 52 of the housing section 13 which defines the inner end of the recess 57 or may be held against longitudinal movement relative to the internal flange 52 by the threaded engagement of its external flange 56 therewith.

The external diameter of the strain member is smaller than the internal diameter of the housing so that a cylindrical chamber 65 is formed by the strain member and the housing 11, the longitudinal axes of the chamber and the strain member being coaxial.

The strain member intermediate its ends and preferably at its longitudinal midplane is provided with a plurality of ports 70 which permit the fluid pressure from the longitudinal flow passage 71 of the strain member to be communicated to the annular chamber 65.

A pair of strain gages a and b are bonded or otherwise secured to the strain member at an upstream portion 48a thereof upstream of the ports 70. The resistances of the strain gages a and b vary directly with the longitudinal forces exerted on the upstream portion 48a due to friction between the strain member and the fluid flowing through the passage 71 thereof. A similar pair of strain gages c and d are bonded to the external surfaces of a downstream portion 48b of the strain member downstream of the ports 70 whose resistances vary inversely as the longitudinal forces exerted on the strain member by the friction between the strain member and the fluid flowing through the passage 71.

The strain gages a and b are so secured to the upstream portion 48a, that any longitudinal forces acting in a downstream direction on the upstream portion 48a of the strain member, whose upstream end is fixed to the housing, tend to cause longitudinal elongation of the upstream portion and of the strain gages a and b and thus increase their resistances.

Conversely, the strain gages c and d are so secured to the downstream strain member portion 48b that any longitudinal forces acting in a downstream direction on the strain member downstream portion 48b whose downstream end is fixed to the housing, tend to cause longitudinal shortening of the downstream portion 48b and of the strain gages c and d and thus decrease their resistances.

Figure 2:
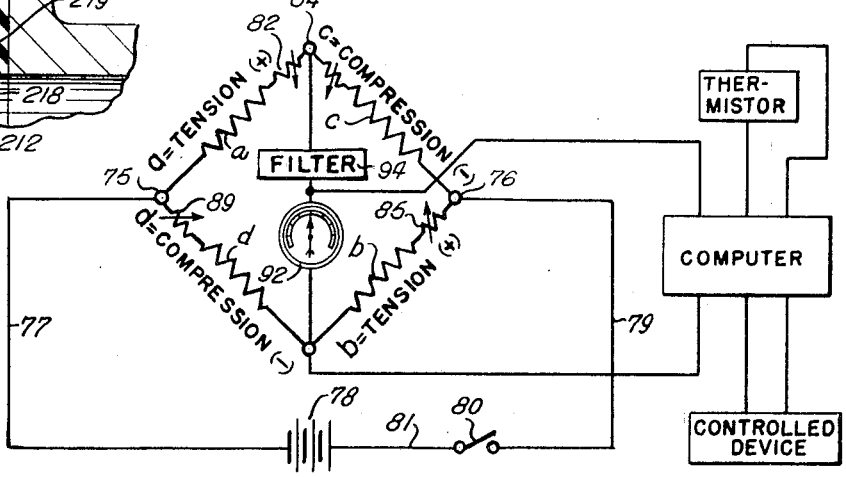
FIG. 2 is a diagrammatic illustration of the electric circuit of the device illustrated in FIG. 1.

The strain gages are connected in the usual Wheatstone bridge illustrated in FIG. 2, which has input terminals 75 and 76, the input terminal 75 being connected by a conductor 77 to one side of a source of direct current, such as a battery 78, and the other input terminal 76 being connected to the other side of the battery through the conductor 79, a manually operable switch 80 and a conductor 81. The strain gage a is connected in se with a variable calibrating resistance 82 between the input terminal 75 of the bridge and its output terminal 84; the strain gage b is connected in series with the calibrating variable resistance 85 between the input terminal 76 and the other output terminal 87 of the bridge; the strain gage c is connected in series with a calibrating resistance 88 between the input terminal 76 and the output terminal 84; and the strain gage d is connected in series with a calibrating resistance 89 between the input and output terminals 84 and 87 of the Wheatstone bridge. The strain gages are so connected that both increases in the resistance of the strain gages a and b and decreases in the resistances of the strain gages c and d tend to increase the voltage appearing across the output terminals 84 and 87. As a result, the Wheatstone bridge provides a direct current voltage which varies directly in accordance with the longitudinal forces exerted on the strain member by the friction between the strain member and the fluid flowing therethrough. In turn, these frictional forces for a given viscosity of a particular fluid vary directly as the velocity of rate of flow of the fluid through the strain member. This voltage may be indicated visually by a volt meter 92 connected in series with a filter 94 across the bridge output terminals. The filter may be of any suitable type and is provided to filter out short period transients or oscillations of the output voltage due to turbulence of the fluid flowing through the strain member or any extraneous forces exerted in any manner on the sensing device. For example, if the fluid flowing through the flow conductor C and the strain member is a liquid carrying solid particles, the solid particles may impart vibrations which will result in relatively high frequency variations in the output voltage.

The strain gages a and c are mounted on the top surface of the strain member and the strain gages b and d are mounted on the bottom surface thereof directly below the gages a and c, respectively, so that any gravity forces acting on the strain member 48, which cause it to tend to bow downwardly, will cause longitudinal compressional forces to be exerted on the strain gages a and c and simultaneously will cause equal tensional forces to be exerted on the strain gages b and d. As a result, changes in one direction in the resistances of the strain gages a and c due to gravity are balanced by the changes in the opposite direction of the resistances of the strain gages b and d so that the output of the Wheatstone bridge will not vary with changes in the specific density of the fluid flowing through the sensing device.

Similarly, variations in the longitudinal forces imposed on the strain member due to temperature variations, which tend to increase or decrease the length of the strain member, do not unbalance the Wheatstone bridge since changes in the resistances of all strain ages due to this cause are equal and, of course, the resistance of the strain gages under normal (no-load) conditions are equal.

Since the pressures internally and externally of the strain member, that is, in the longitudinal flow passage 71 of the strain member and in the annular chamber 65, are equal, due to the provision of the ports 70, variations in the pressure of the fluid flowing through the flow conductor an the strain member will not result in any radial expansion or contraction of the strain member. As a result, fluid pressure variations will not cause variations in the resistances of the strain gages, and therefore, variations in the output voltage of the Wheatstone bridge.

It will now be apparent that the strain member may have a relatively thin cylindrical wall, since fluid pressure forces exerted thereon are balanced, so that appreciable variations in the lengths, or longitudinal contractions and expansions, of the upstream and downstream portions 48a and 48b and therefore in the resistances of the strain gages bonded thereto, will occur for given changes in the longitudinal forces exerted on the strain member due to the friction between the strain member and the fluid flowing therethrough. The degree of these variations in the longitudinal expansions and contractions of the upstream and downstream portions of the strain member is further increased by the provision of the ports 70 which mechanically weaken the central portion 48c of the strain member and enable it to accommodate, by its longitudinal contraction or elongation, the elongations and contractions of the upstream and downstream portions of the strain member.

In order to permit the venting of any gases which may be trapped in the chamber 65 upon the initiation of operation of the flow of fluids through the conductor C, and therefore through the sensing device 10, a port 92 is provided in the top of one of the housing sections, for example, the housing section 13, which is closable by a plug 95. A drain port 96, closable by plug 97, is provided in the bottom of the housing section 13 through which any sediment or extraneous substances may be removed from the chamber 65.

A temperature sensing device 106, such as a thermistor, may also be secured to the strain member 48, which is preferably of metal and therefore a good heat conductor, for sensing the temperature of the fluid flowing through the strain member. The cable of the various conductors from the strain gages and the thermistor extends outwardly from the chamber 65 through a suitable aperture 102 in the housing section 12 and a suitable sealing means 103 which provides a fluidtight seal between such conductors and the housing.

It will be apparent that the sealing means, shown as a simple gasket for purposes of illustration, may be of any suitable form to provide the desired sealing effect depending on the pressure of the fluids flowing through the flow conductor, as, for example, a packing having a gland nut for compressing the packing between the cable and the housing.

Assuming now that the sensing device 10 has been connected between the sections C1 and C2 of the flow conductor, the strain member may now be initially subjected to a limited longitudinal compressional force upon the connection of the two housing sections to one another. Since all of the strain gages are subjected to the same compressional force, however, the Wheatstone bridge will be balanced and no output voltage will appear across the output terminals 84 and 87 thereof.

Assuming now that a fluid of known constant viscosity and known constant temperature is caused to flow through a flow conductor in the direction indicated by the arrows in FIG. 1, the longitudinal forces exerted on the strain member due to the friction between the strain member and the fluid flowing through the strain member will vary directly in accordance with the velocity of flow of the fluid through the flow conductor and the strain member and the output voltage o signal across the output terminals 84 and 87 of the bridge will vary directly in accordance with the velocity of fluid flow through the strain member. It will be apparent of course that such frictional forces exert tensional or elongation forces on the strain gages a and b and thus tend to increase their resistances and longitudinally compressional or contraction forces on the strain gages c and d. The scale of the voltage meter 92 is of course calibrated to give a direct reading of the velocity and, therefore, the rate of flow of the fluid through the flow conductor C, as, for example, in gallons per minute, or the like.

Assuming now that the temperature of the fluid, as, for example, oil, food liquids and the like, may vary and thus also cause its viscosity to vary, it will be apparent that for a given velocity of fluid flow through the strain member, the voltage across the output terminals 84 and 87 will be lower for a higher temperature of the fluid, since its viscosity then will be less, than for a lower value of its temperature since its viscosity will then be lower. Variations in the voltage output of the Wheatstone bridge due to such changes in the temperature of the fluid may be determined either theoretically by mathematical formulas or empirically for a particular fluid and used to program a suitable computer 105 to which the output of the Wheatstone bridge may be applied by the conductors 106 and 107. The variations in the resistance of the temperature sensing means, such as the thermistor 101, are determined by suitable circuitry of the computer, the thermistor being properly connected to such circuitry by the conductors 108 and 109. The computer may also provide a direct current voltage or signal which will be indicative of the velocity or rate of flow of the given fluid through the flow conductor C even though its temperature, and therefore its viscosity, may vary. The controlled device 110 may of course be an electrically operable valve, another computer, a recording device, or the like.

Assuming now that if the fluid must flow through the flow conductor C at a constant velocity or rate but that its viscosity may vary, which variation of viscosity may be an indication of a variation in a particular characteristic or property of the fluid, the sensing device 10 may be used to determine such variations in this characteristic. For example, if the fluid is a solution of a sugar in water and is being moved through the flow conductor C at a constant rate or velocity, as by a positive displacement pump operating at a constant speed, the sensing device 10 may be used to ascertain the quantity of sugar which has been transported in solution through the flow conductor C over a period of time, or the concentration or the rate at which it is being so transported at any particular instant of time.

The output of the Wheatstone bridge will vary directly as the viscosity of the fluid, it being apparent that the longitudinal forces exerted on the strain member by fluid flowing therethrough will vary directly as the viscosity of the fluid. The computer 105 can be programmed to compute the amount of sugar transported over a period of time, in accordance with and responsive to the output signal of the Wheatstone bridge, while the meter 92 can be provided with two different scales, one calibrated to indicate the viscosity of the solution and the other scale being calibrated to indicate the concentration of the solution flowing through the conductor C at any instant of time.

Assuming now that not only the viscosity but also the temperature of the fluid may vary, even though it is flowing at a constant rate or velocity through the flow conductor C, the longitudinal forces exerted on the strain member will now vary with the viscosity of the fluid which in turn will vary with its temperature. A formula expressing the relationship between the viscosity, temperature and concentration of the sugar in the solution may be determined either theoretically or empirically and the computer 105 may be programmed to cause its output signal to the controlled device to carry in accordance with the concentration of the sugar in the solution, and thus the rate of the transport of the sugar through the flow conductor, even though the temperature of the solution may vary from time to time. The meter 92 will in this case be capable of indicating only the viscosity of the fluid.

The computer 105 may, in this case, be used to measure the amount of sugar transported through the flow conductor during a given period of time, the rate at which it is being transported at any instant of time, or the concentration of the sugar in the solution being transported through the flow conductor at any particular instant of time and to provide an output voltage or signal to the control which varies in accordance with any one of the above characteristics of the fluid flowing through the flow conductor C.

Figure 3:
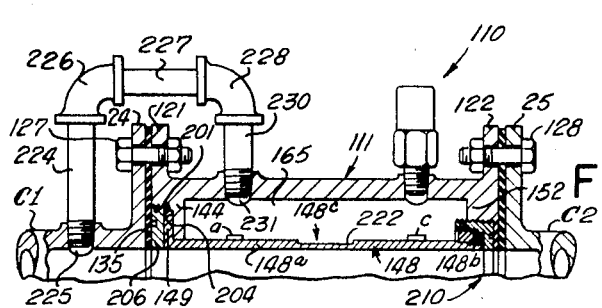
FIG. 3 is a fragmentary sectional view of a modified form of the device illustrated in FIG. 1; and, FIG. 4 is a fragmentary enlarged sectional view of a portion of the device illustrated in FIG. 3.

Referring now to FIG. 3 of the drawings, the sensing device 110 embodying the invention there illustrated, is substantially similar to the sensing device 10 illustrated in FIGS. 1 and 2 and, accordingly, its elements have been provided with the same reference numerals, to which the prefix "1" has been added, as the corresponding elements of the sensing device 10.

The housing 111 of the sensing device is formed of a single tubular member whose external annular end flanges 120 and 121 are connected to the flanges 24 and 25, respectively, of the flow conductor sections C1 and C2 by the bolts 127 and 128, respectively. The strain member 148 is an imperforate tubular member whose upstream end is provided with an internal annular flange 149 receivable in a recess 201 of the internal end flange 144 of the housing at its upstream end. The inner annular surface of the flange 149 engages the annular shoulder or stop surface 204 defining the inner end of the recess. A ring nut 206 is threadable in the outer end of the recess to rigidly hold the flange 201 against the flange 149. A gasket 135 seals between the outer end of the ring nut 206 and the adjacent surface of the conductor sections C1 as well as between the flanges 21 and 24.

The downstream end of the strain member 148 is secured to the housing internal flange 152 by a strain adjusting means for assembly 210 which includes an external annular stop ring 211 threaded on the downstream end of the strain member and secured against rotation thereon by any suitable means, as for example, by a set screw, now shown. An adjusting ring 202 of the adjusting assembly is provided with external threads for engaging the internal threads of the internal flange 152 of the housing and with a longitudinal annular inwardly extending flange 213 which is telescopical over the stop ring 211 and a retainer ring 216 slidably mounted on the strain member upstream of the stop ring. The adjusting ring is rigidly secured to the retainer ring as by threads and held against rotation relative thereto by one or more set screws 217. The upstream annular side surface of the stop ring 211 is slidably engaged by the annular end surface of the retainer ring 216 while its downstream annular side surface is similarly slidably engaged by the internal annular surface 218 of the adjusting ring 212.

The adjusting ring is provided with suitable sockets 219 in which are receivable lugs of a suitable tool used to rotate the adjusting ring.

It will be apparent that the adjusting assembly 210 is first mounted on the downstream end of the strain member 148 which is then moved inwardly through the aperture of the upstream end housing internal flange 144 and the adjusting ring is then threaded in the downstream end housing internal flange 152 until the strain member flange 149 engages the housing flange 144. The ring nut 206 is then threaded in the recess 201 to cause the upstream end of the strain member to be rigidly held secured to the upstream end of the housing. The adjusting ring may now be used either to impart a desired predetermined longitudinal strain to the strain member 148 either by threading the adjusting ring inwardly to compress the strain member or outwardly to tension the strain member.

The strain member, if desired, may be provided with an external annular recess 222 intermediate its end so that the central portion 148c of the strain gage may be of lesser mechanical strength than the upstream and downstream portions 148a and 148b.

Pressure from the interior of the upstream flow conductor C1 is communicated to the annular chamber 165 between the housing and the strain member through a conduit means which may include a nipple 224 having one end threaded in a bore or aperture 225 of the conductor section c1, and elbow fitting 226, a nipple 227, an elbow 228 and a nipple 320 whose lower end is threaded in an aperture or port 321 of the housing 111.

It will be apparent that the sensing device 110 may be used for the same purposes and in the same manner as the sensing device 10 to sense or measure a predetermined characteristic of a fluid flowing through a flow conductor.

While the two illustrated and described embodiments of the invention, the strain members have been shown as having mechanically weakened central sections, such as the section 48c, FIG. 1, and the section 148c, FIG. 3, the mechanical strength of the strain members throughout their lengths may be uniform. For example, an external annular flange may be provided about the central section 48c of the strain member 48 and integral therewith to compensate for the removal of the metal at the ports 70. Similarly, the strain member 148 may be made of uniform thickness throughout its length by not forming the annular external recess 222 therein.

Moreover, while in the illustrated embodiments of the invention the internal surfaces of the various components of the sensing devices defining the longitudinal flow passage connecting the flow passages of the flow conductor sections C1 and C2 are uniform to prevent or minimize creation of turbulence in the fluid flowing through the sensing device, if desired, or made necessary y the characteristics of a particular fluid, the strain member may have its internal surfaces so formed as to increase the longitudinal forces exerted thereon by fluid flowing therethrough, as, for example, by providing the strain member with longitudinally spaced serrations.

It will now be seen that a new and improved fluid characteristic sensing device has been illustrated and described which includes a housing, such as the housing 11 or 111, connectable to a flow conductor C and having a tubular strain member such as the strain member 48 or 48a, extending through the housing and defining with the housing an annular chamber about the strain member.

It will further be seen that the flow passage of the strain member is coaxial with and of the same internal diameter as the flow passage of the flow conductor to which it is connected so that the sensing device will not to any material degree adversely affect the flow of fluid through the flow conductor.

It will further be seen that the strain member has means, such as strain gages, for sensing the strain in upstream and downstream portions of the strain member which vary in accordance with the longitudinal forces exerted on the strain member by fluids flowing therethrough.

It will further be seen that the strain gages are connected in a Wheatstone bridge circuit to provide an output voltage of signal which varies in accordance with the longitudinal forces exerted on the strain member by the fluid flowing therethrough.

It will also be seen that the sensing device may be provided with a temperature sensing means for sensing the temperature of a fluid flowing therethrough so that variations in a particular characteristic of the fluid, such as its viscosity which varies in accordance with its temperature, may be compensated for or taken into account, its providing an accurate signal indicative of a characteristic of the fluid.

It will further be seen that the strain member of the sensing device may be made of any suitable material and be of relatively small thickness since the pressures internally and externally of the strain member are equal and no radial expansion or contraction forces are exerted on the strain member by the fluid whose characteristic is being sensed, it being apparent that if the pressures within and without the strain gage member were not balanced, the strain member, particularly for higher fluid pressures, would have to be of such thickness or strength that the variations in the resistances of the strain gages for given variations in the longitudinal forces exerted therein by the fluid flowing therethrough would be relatively small.

It will now be seen that a new and improved sensing device has been illustrated and described which is of very simple structure, which is easily installed in a flow conductor or flow line, and that its signal output may be used to determine such characteristics of the fluid flowing through the flow conductor as its velocity o rate of flow, viscosity, or concentration of substances dissolved in the fluid or carried thereby.

The foregoing description of the invention is explanatory only, and changes in the details of the construction illustrated may be made by those skilled in the art, within the scope of the appended claims, without departing from the spirit of the invention.

What is claimed and desired to be secured by Letters Patent:

1. A sensing device including: an elongate housing connectable in a flow conductor; a tubular strain member disposed in said housing having opposite ends fixedly connected to said housing, said strain member having a longitudinally straight flow passage constituting a section of the flow passage of a flow conductor to which the housing is connectable and being coaxial with the flow passage of the conductor; individual sensing means secured to said strain member at longitudinally spaced locations for sensing forces exerted on upstream and downstream portions of said strain member caused by fluids flowing through said flow passage of said strain member, and means providing fluid communication between said chamber and the flow passage of said strain member for balancing the pressures internally and externally of said strain member.

2. The sensing device of claim 1, and first means operatively associated with said sensing means for providing an electric signal which varies in accordance with the longitudinal forces exerted on said strain member sensed.

3. The sensing device of claim 2, and second means for sensing the temperature of a fluid flowing through said strain member and having an electric value which varies with the temperature.

4. The sensing device of claim 3, and third means operatively associated with said first means and said second means for providing a signal which varies in a predetermined manner in accordance with said electric signal and said electric value.

5. The sensing device of claim 4, said means for sensing longitudinal forces exerted on an upstream portion of said strain member comprising a first pair of strain gauges secured to oppositely facing surfaces of an upstream portion of said strain member and said means for sensing longitudinal forces exerted on a downstream portion of said strain member comprising a second pair of strain gauges secured to oppositely facing surfaces of said strain member.

6. The sensing device of claim 5, wherein said strain gauges are connected in a Wheatstone bridge for causing increases in the electric resistance of said first pair of strain gauges and decreases in the resistances of said secured pair of strain gauges both tending to cause unbalance of said Wheatstone bridge in such manner as to increase the output signal of said Wheatstone bridge.

7. The sensing device of claim 6, an intermediate portion of said strain member between said upstream and downstream portions of said strain member being mechanically weakened.

8. The sensing device of claim 7, wherein said means for providing fluid communication comprises port means in an intermediate portion of said strain member.

9. The sensing device of claim 8, and means for imposing a predetermined longitudinal stress on said strain member.

10. The sensing device of claim 9, wherein said stress imposing means is adjustable to vary the longitudinal stress in said strain member.

11. The sensing device of claim 7, wherein said means for providing fluid communication comprises conduit means for connecting said chamber to an upstream portion of the flow conductor in which said housing is connectable 12. The sensing device of claim 1, said means for sensing longitudinal strain forces exerted on an upstream portion of said strain member comprising a first pair of strain gauges secured to oppositely facing surfaces of an upstream portion of said strain member and said means for sensing longitudinal forces exerted on a downstream portion of said strain member comprising a second pair of strain gauges secured to oppositely facing surfaces of said strain member.

13. The sensing device of claim 12, wherein said strain gauges are connected in a Wheatstone bridge for causing increases in the electric resistance of said first pair of strain gauges and decreases in the resistances of said secured pair of strain gauges both tending to cause unbalance of said Wheatstone bridge in such manner as to increase the output signal of said Wheatstone bridge.

14. The sensing device of claim 13, an intermediate portion of said strain member between said upstream and downstream portions of said strain member being mechanically weakened.

15. The sensing device of claim 14, wherein said means for providing fluid communication comprises port means in an intermediate portion of said strain member.

16. The sensing device of claim 15, and means for imposing a predetermined longitudinal stress on said strain member.

17. The sensing means of claim 16, wherein said stress imposing means is adjustable to vary the longitudinal stress in said strain member.

18. The sensing device of claim 17, wherein said means for providing fluid communication comprises conduit means for connecting said chamber to an upstream portion of the flow conductor in which said housing is connectable.

* * * * *